(12) United States Patent
Michaels et al.

(10) Patent No.: US 7,970,809 B2
(45) Date of Patent: Jun. 28, 2011

(54) MIXED RADIX CONVERSION WITH A PRIORI DEFINED STATISTICAL ARTIFACTS

(75) Inventors: Alan J. Michaels, West Melbourne, FL (US); David B. Chester, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 928 days.

(21) Appl. No.: 11/759,277

(22) Filed: Jun. 7, 2007

(65) Prior Publication Data

US 2008/0307022 A1 Dec. 11, 2008

(51) Int. Cl.
G06F 7/58 (2006.01)
(52) U.S. Cl. ........................................ 708/250
(58) Field of Classification Search .................. None
See application file for complete search history.

(56) References Cited

U.S. PATENT DOCUMENTS

| | | |
|---|---|---|
| 3,564,223 A | 2/1971 | Harris et al. |
| 4,646,326 A | 2/1987 | Backof, Jr. et al. |
| 4,703,507 A | 10/1987 | Holden |
| 5,007,087 A | 4/1991 | Bernstein et al. |
| 5,048,086 A | 9/1991 | Bianco et al. |
| 5,077,793 A | 12/1991 | Falk et al. |
| 5,276,633 A | 1/1994 | Fox et al. |
| 5,297,153 A | 3/1994 | Baggen et al. |
| 5,297,206 A | 3/1994 | Orton |
| 5,319,735 A | 6/1994 | Preuss et al. |
| 5,412,687 A | 5/1995 | Sutton et al. |
| 5,598,476 A | 1/1997 | LaBarre et al. |
| 5,757,923 A | 5/1998 | Koopman, Jr. |
| 5,811,998 A | 9/1998 | Lundberg et al. |
| 5,852,630 A | 12/1998 | Langberg et al. |
| 5,900,835 A | 5/1999 | Stein |
| 5,924,980 A | 7/1999 | Coetzee |
| 5,937,000 A | 8/1999 | Lee et al. |

(Continued)

FOREIGN PATENT DOCUMENTS

EP 0 849 664 A2 6/1998

(Continued)

OTHER PUBLICATIONS

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

(Continued)

*Primary Examiner* — David H Malzahn
(74) *Attorney, Agent, or Firm* — Fox Rothschild, LLP; Robert J. Sacco (57) ABSTRACT

A method is presided for masking a process used in generating a random number sequence. The method includes generating a random number sequence. This step involves selectively generating the random number sequence utilizing a ring structure which has been punctured. The method also includes performing a mixed radix conversion to convert the random number sequence from a first number base to a second number base. The method further includes puncturing the ring structure by removing at least one element therefrom to eliminate a statistical artifact in the random number sequence expressed in the second number base. The first number base and second number base are selected so that they are respectively defined by a first Galois field characteristic and a second Galois field characteristic.

17 Claims, 7 Drawing Sheets

U.S. PATENT DOCUMENTS

| | | | |
|---|---|---|---|
| 6,014,446 | A | 1/2000 | Finkelstein |
| 6,023,612 | A | 2/2000 | Harris et al. |
| 6,038,317 | A | 3/2000 | Magliveras et al. |
| 6,078,611 | A | 6/2000 | La Rosa et al. |
| 6,304,216 | B1 | 10/2001 | Gronemeyer |
| 6,331,974 | B1 | 12/2001 | Yang et al. |
| 6,377,782 | B1 | 4/2002 | Bishop et al. |
| 6,570,909 | B1 | 5/2003 | Kansakoski et al. |
| 6,614,914 | B1 | 9/2003 | Rhoads et al. |
| 6,744,893 | B1 | 6/2004 | Fleming-Dahl |
| 6,754,251 | B1 | 6/2004 | Sriram et al. |
| 6,766,345 | B2 | 7/2004 | Stein et al. |
| 6,842,479 | B2 | 1/2005 | Bottomley |
| 6,980,656 | B1 | 12/2005 | Hinton, Sr. et al. |
| 6,986,054 | B2 | 1/2006 | Kaminaga et al. |
| 7,023,323 | B1 | 4/2006 | Nysen |
| 7,027,598 | B1 | 4/2006 | Stojancic et al. |
| 7,069,492 | B2 | 6/2006 | Piret et al. |
| 7,076,065 | B2 | 7/2006 | Sherman et al. |
| 7,078,981 | B2 | 7/2006 | Farag |
| 7,079,651 | B2 | 7/2006 | Den Boer et al. |
| 7,095,778 | B2 | 8/2006 | Okubo et al. |
| 7,133,522 | B2 | 11/2006 | Lambert |
| 7,170,997 | B2 | 1/2007 | Petersen et al. |
| 7,190,681 | B1 | 3/2007 | Wu |
| 7,200,225 | B1 | 4/2007 | Schroeppel |
| 7,233,969 | B2 | 6/2007 | Rawlins et al. |
| 7,233,970 | B2 | 6/2007 | North et al. |
| 7,245,723 | B2 | 7/2007 | Hinton, Sr. et al. |
| 7,269,198 | B1 | 9/2007 | Elliott et al. |
| 7,269,258 | B2 | 9/2007 | Ishihara et al. |
| 7,272,168 | B2 | 9/2007 | Akopian |
| 7,277,540 | B1 | 10/2007 | Shiba et al. |
| 7,529,292 | B2 | 5/2009 | Bultan et al. |
| 7,643,537 | B1 | 1/2010 | Giallorenzi et al. |
| 7,779,060 | B2 | 8/2010 | Kocarev et al. |
| 7,830,214 | B2 | 11/2010 | Han et al. |
| 7,853,014 | B2 | 12/2010 | Blakley et al. |
| 2002/0099746 | A1 | 7/2002 | Tie et al. |
| 2003/0044004 | A1 | 3/2003 | Blakley et al. |
| 2004/0001556 | A1 | 1/2004 | Harrison et al. |
| 2004/0059767 | A1 | 3/2004 | Liardet |
| 2004/0196212 | A1 | 10/2004 | Shimizu |
| 2005/0031120 | A1 | 2/2005 | Samid |
| 2005/0050121 | A1 | 3/2005 | Klein et al. |
| 2005/0089169 | A1 | 4/2005 | Kim et al. |
| 2005/0207574 | A1 | 9/2005 | Pitz et al. |
| 2005/0274807 | A1 | 12/2005 | Barrus et al. |
| 2006/0072754 | A1 | 4/2006 | Hinton et al. |
| 2006/0123325 | A1 | 6/2006 | Wilson et al. |
| 2006/0209932 | A1 | 9/2006 | Khandekar et al. |
| 2006/0251250 | A1 | 11/2006 | Ruggiero et al. |
| 2007/0121945 | A1 | 5/2007 | Han et al. |
| 2007/0230701 | A1 | 10/2007 | Park et al. |
| 2008/0008320 | A1 | 1/2008 | Hinton et al. |
| 2008/0016431 | A1 | 1/2008 | Lablans |
| 2008/0095215 | A1 | 4/2008 | McDermott et al. |
| 2008/0198832 | A1 | 8/2008 | Chester |
| 2008/0263119 | A1 | 10/2008 | Chester et al. |
| 2008/0294710 | A1 | 11/2008 | Michaels |
| 2008/0294956 | A1 | 11/2008 | Chester et al. |
| 2008/0304553 | A1 | 12/2008 | Zhao et al. |
| 2008/0304666 | A1 | 12/2008 | Chester et al. |
| 2008/0307022 | A1 | 12/2008 | Michaels et al. |
| 2008/0307024 | A1 | 12/2008 | Michaels et al. |
| 2009/0034727 | A1 | 2/2009 | Chester et al. |
| 2009/0044080 | A1 | 2/2009 | Michaels et al. |
| 2009/0110197 | A1 | 4/2009 | Michaels |
| 2009/0122926 | A1 | 5/2009 | Azenkot et al. |
| 2009/0196420 | A1 | 8/2009 | Chester et al. |
| 2009/0245327 | A1 | 10/2009 | Michaels |
| 2009/0279688 | A1 | 11/2009 | Michaels et al. |
| 2009/0279690 | A1* | 11/2009 | Michaels et al. ............ 380/28 |
| 2009/0296860 | A1 | 12/2009 | Chester et al. |
| 2009/0300088 | A1 | 12/2009 | Michaels et al. |
| 2009/0309984 | A1 | 12/2009 | Bourgain et al. |
| 2009/0310650 | A1 | 12/2009 | Chester et al. |
| 2009/0323766 | A1 | 12/2009 | Wang et al. |
| 2009/0327387 | A1 | 12/2009 | Michaels et al. |
| 2010/0111296 | A1 | 5/2010 | Brown et al. |

FOREIGN PATENT DOCUMENTS

| | | |
|---|---|---|
| EP | 0 949 563 | 10/1999 |
| EP | 2 000 900 | 12/2008 |
| EP | 2 000 902 A2 | 12/2008 |
| GB | 1167272 A | 10/1969 |
| WO | WO-0135572 A2 | 5/2001 |
| WO | WO-2006 110954 | 10/2006 |
| WO | WO 2008 065191 | 6/2008 |
| WO | WO-2008099367 A2 | 8/2008 |
| WO | WO-2008130973 A1 | 10/2008 |
| WO | WO 2009 146283 | 12/2009 |

OTHER PUBLICATIONS

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004, XPOO258039.

Manikandan, et al, "A Novel Pulse Based Ultrawide Band System Using Chaotic Spreading Sequences" Communication Systems Software and Middleware, 2007. Comsware 2007. 2nd International Conference on, IEEE, PI, Jan. 1, 2007, pp. 1-5, XP031113946 ISBN: 978-1-4244-0613-5; p. 1, p. 5.

Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Aug. 4, 2009] pp. 47-48; pp. 50-51.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

U.S. Appl. No. 12/027,658, filed Feb. 7, 2008.

U.S. Appl. No. 12/117,086, filed May 8, 2008.

Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Kolumban, et al., "Chaotic Communications with Correlator Receivers: Theory and Performance Limits" Proceedings of the IEEE, vol. 90, No. 5, May 2002.

Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].

Morsche et al., "Signals and Systems," lecture notes, University of Eindhoven, The Netherlands (1999).

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.

Vanwiggeren, et al., "Chaotic Communication Using Time-Delayed Optical Systems," International Journal of Bifurcation and Chaos, vol. 9, No. 11, (1999) pp. 2129-2156, World Scientific Publishing Co.

Yen, et al., (1999) "Residual Number System Assisted CDMA: A New System Concept", In: ACTS'99, Jun. 8-11, 1999, Sorrento, Italy.

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.

Michaels., A., U.S. Appl. No. 12/056,024 entitled "Selective Noise Cancellation of a Spread Spectrum Signal" filed Mar. 26, 2008.

Chester et al., U.S. Appl. No. 12/116,104, entitled "A Closed Galois Field Cryptographic System" filed May 6, 2008.

Chester, et al., U.S. Appl. No. 12/131,386, filed Jun. 2, 2008, Entitled "Adaptive Correlation".

Chester, et al., U.S. Appl. No. 12/137,593, filed Jun. 12, 2008, entitled "Featureless Coherent Chaotic Amplitude Modulation".

Michaels, et al., U.S. Appl. No. 12/129,197, filed May 29, 2008, entitled "Digital Generation of an Accelerated or Decelerated Chaotic Numerical Sequence".

Michaels, et al., U.S. Appl. No. 12/129,654, filed May 29, 2008, entitled "Sine/Cosine Generator".

Michaels, et al., U.S. Appl. No. 12/496,214, filed Jul. 1, 2009, entitled "Anti-Jam Communications Having Selectively Variable PAPR Including CAZAC Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Michaels, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jun. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "Ad-Hoc Network Acquisition Using Chaotic Sequence Spread Waveform".

Michaels, Alan, U.S. Appl. No. 12/201,021, filed Aug. 29, 2008, entitled, "Multi-Tier Ad-Hoc Network Communications".

Aparicio; "Communications Systems Based on Chaos" May 2007. Universidad Rey Juan Carlos.

Bererber, S.M., et al., "Design of a CDMA Sysetm in FPGA Technology", Vehicular Technology Conference, 2007. VTC2007-Spring. IEEE 65th Apr. 22, 2007, Apr. 25, 2007, pp. 3061-3065, XP002575053 Dublin ISBN: 1-4244-0266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. 1-1_1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE AFRICON 2002 Oct. 2, 2002,Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From Math World-A Wolfram Web Resource, created by Eric W. Weisstein, [online] [retrieved on Nov. 8, 2010] Retrieved from the Internet: <<http://mathworld.wolfram.com/Bijective.html>>.

Weisstein, E., Surejection:, From MathWorld-AWolfram Web Resource [online] [retrieved on Nov. 8, 2010] Retrieved from the Internet: <<http://mathworld.wolfram.com/surjection.html>>.

Harris Corp., International Search Report mailed Feb. 11, 2010, Application Serial No. PCT/US2009/059948.

Harris Corp., International Search Report mailed Apr. 13, 2010, Application Serial No. PCT/US2009/0069121.

Harris Corp., International Search Report mailed Apr. 13, 2010, Application Serial No. PCT/US2009/0069118.

Harris Corp., European Search Report mailed Mar. 4, 2010, Patent Application No. 08009745.4.

U.S. Appl. No. 11/759,276, filed Dec. 11, 2008, Michaels, Alan J.

Taylor, F.J., "Residue Arithmetic A Tutorial with Examples", Computer, vol. 17, No. 5, pp. 50-62, May 1984, doi: 10.1109/MC. 1984.1659138.

\* cited by examiner

MIXED RADIX CONVERSION WITH A PRIORI DEFINED STATISTICAL ARTIFACTS

BACKGROUND OF THE INVENTION

1. Statement of the Technical Field

The inventive arrangements relate to communications systems having ring generators. More particularly, the inventive arrangements relate to a method and system for performing a mixed radix conversion absent of unwanted statistical artifacts.

2. Description of the Related Art

Many number theoretic based computational systems can include ring generators. A ring generator is a simple structure over a finite field that exhaustively produces possible outputs through repeated mapping. The mapping is some combination of an additive and a multiplicative mapping, with irreducible polynomials being ideal. For example, a ring generator includes repeated computations of an irreducible polynomial $f(x)=3x^3+3x^2+x$ on the finite Galois field, GF[11]. A finite or Galois field GF[M] is a field that contains only a finite number of elements $\{0, 1, 2, \ldots, M-1\}$. The finite or Galois field GF[M] has a finite field size defined by the Galois characteristic M. M is most often chosen to be either a power of two (2) or an odd prime.

Despite the advantages of such a ring generator, it suffers from certain drawbacks. For example, the odd-sized ring generators reliance on the Galois characteristic M is computationally inefficient in a digital (binary) domain. Also, lookup table operations performed in the finite or Galois field GF[M] are resource intensive. Moreover, the ring generator's orbits are highly deterministic. As such, knowledge of a mapping and current finite field conditions gives complete knowledge of an output sequence and in many applications it is desirable to mask this information. Such applications include, but are not limited to, a spread spectrum communications application and a cryptography application.

In view of the forgoing, there remains a need for a ring generator implementing an arithmetic operation that is computationally efficient in a digital (binary) domain. There is also a need for a ring generator having an implementation that is less hardware intensive than conventional ring generator implementations. There is further a need for a ring generator having orbits that are more robust in obscuring their deterministic characteristics.

SUMMARY OF THE INVENTION

The invention concerns a method for masking a process used in generating a random number sequence. The method includes generating a random number sequence. This step involves selectively generating the random number sequence utilizing a ring structure which has been punctured. The method also includes performing a mixed radix conversion to convert the random number sequence from a first number base to a second number base. The method further includes using the random number sequence to modify a data stream. The term "random number sequence" as used herein refers to a sequence of numerical values that each mimic independent random numbers from a chosen statistical distribution.

According to an aspect of the invention, the method includes puncturing the ring structure by removing at least one element therefrom. This puncturing is performed to eliminate a statistical artifact in the random number sequence expressed in the second number base. The method also includes selecting the punctured elements to induce a chosen statistical artifact in the mixed radix conversion. The method further includes selecting the first number base and the second number base so that they are respectively defined by a first Galois field characteristic and a second Galois field characteristic. The first Galois field characteristic can be selected so that it is mutually prime with respect to the second Galois field characteristic. The second Galois field characteristic is selected to be a finite field size which is smaller than a finite field size of a first Galois field.

According to another aspect of the invention, the puncturing step further comprises eliminating n elements) from the ring structure. This puncturing is performed to remove at least one statistical artifact in the random number sequence expressed in the second number base. n is determined based on a mathematical relation between a number of elements in the first Galois field and the number of elements in the second Galois field. More particularly, n is determined based on a remainder value resulting from a quotient of the number of elements in the first Galois field divided by the number of elements in the second Galois field.

According to yet another aspect of the invention, the mixed radix conversion produces a plurality of equivalence classes in the second number base. The n elements which are eliminated from the ring structure are selected to ensure that each equivalence class has an equal number of elements after performing the mixed radix conversion.

A system is also provided. The system comprises a generator and a mixed radix converter. The generator is configured to selectively generate a random number sequence utilizing a ring structure which has been punctured. The mixed radix converter is configured to perform a mixed radix conversion. The mixed radix conversion is performed to convert the random number sequence from a first number base to a second number base. The ring structure which has been punctured and the mixed radix converter are configured in combination to produce a random number sequence in the second number base which is exclusive of any statistical artifacts associated with the mixed radix conversion.

According to an aspect of the invention, the system is further comprised of a means for modifying a data stream utilizing the random number sequence. According to another aspect of the invention, the first number base is defined by a first Galois field characteristic or a compilation of Galois fields of mutually prime characteristic combined via a method similar to the Chinese Remainder Theorem. Similarly, the second number base is defined by a second Galois field characteristic or a compilation of Galois fields of mutually prime characteristic combined via a method similar to the Chinese Remainder Theorem. The first Galois field characteristic is mutually prime with respect to the second Galois field characteristic. The second Galois field characteristic is selected to be a finite field size which is smaller than a finite field size of a first Galois field.

According to another aspect of the invention, the ring structure has n element(s) removed therefrom to eliminate at least one statistical artifact in the random number sequence expressed in the second number base, n is determined based on a mathematical relation between a number of elements in the first Galois field and the number of elements in a second Galois field. More particularly, n is determined based on a remainder value resulting from a quotient of the number of elements in the first Galois field divided by the number of elements in the second Galois field.

According to yet another aspect of the invention, the mixed radix conversion produces a plurality of equivalence classes in the second number base. The n elements which are removed from the ring structure are selected to ensure that each equivalence class has an equal number of elements after the mixed radix conversion.

BRIEF DESCRIPTION OF THE DRAWINGS

Embodiments will be described with reference to the following drawing figures, in which like numerals represent like items throughout the figures, and in which:

FIG. 8 a flow diagram of a method for increasing the security of communications system that is useful for understanding the invention.

DETAILED DESCRIPTION OF THE PREFERRED EMBODIMENTS

Figure 1:
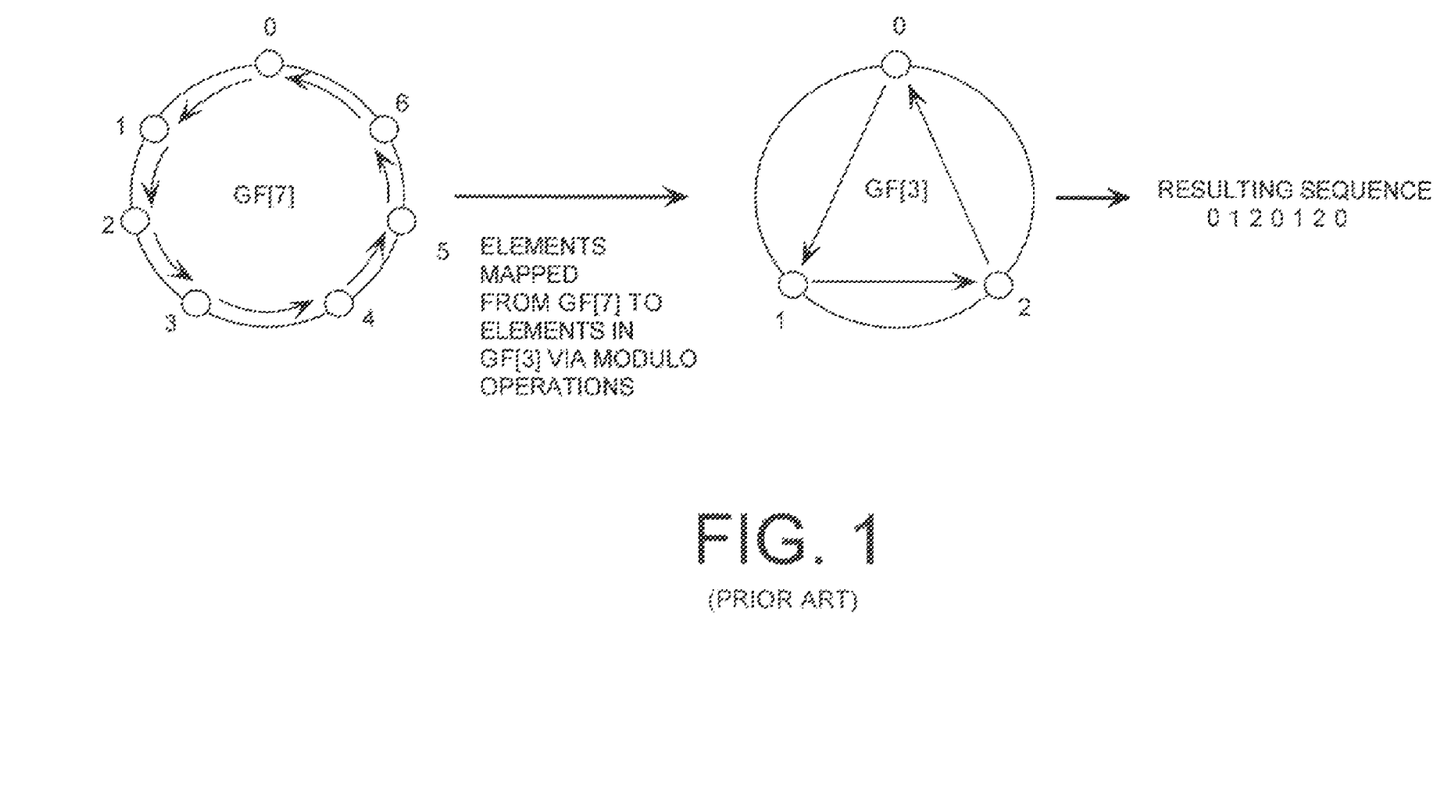
FIG. 1 is a conceptual diagram of a conventional mixed radix conversion algorithm that is useful for understanding the invention.

Referring now to FIG. 1, there is provided a conceptual diagram of a conventional mixed radix conversion algorithm that is useful for understanding the invention. The phrase "mixed radix conversion" as used herein refers to a conversion of a number sequence from a first number base (or radix) to a second number base (or radix). For example, a number sequence expressed in a Galois field GF[7] base is converted to a number sequence expressed in a Galois field GF[3] base.

In communications systems, various algorithms are employed for combining a number sequence with a data stream. This combining process can be performed for encrypting or masking the data stream prior to its transmission over a communications link. Such algorithms can include residue number system (RNS) operations for expressing each number of the number sequence in a Galois field [p] base. A Galois field GF[p] is a field that contains only a finite number of elements $\{0, 1, 2, \ldots p-1\}$. As such, all arithmetic operations performed in the finite or Galois field result in an element within that field. The finite or Galois field GF[p] has a finite field size defined by the Galois characteristic p. As such, a resulting sequence of a Galois field GF[p] operation can repeat every $p^{th}$ element. These RNS operations are well known to persons skilled in the art, and therefore will not be described in great detail herein.

Notably, there is a statistical non-uniformity in an element distribution resulting from a number sequence conversion from a first Galois field $GF[p_1^{k1}]$ base to a second Galois field $GF[p_2^{k2}]$ base when the two (2) number bases are not evenly divisible. For example, a number sequence expressed in a Galois field GF[7] base is mapped to a number sequence expressed in a Galois field GF[3] base. The random number sequence expressed in a Galois field GF[7] base is defined by the set of elements $\{0, 1, 2, \ldots, 6\}$. Similarly, the number sequence expressed in a Galois field GF[3] base is defined by the set of elements $\{0, 1, 2\}$. Mapping the number sequence expressed in a Galois field GF[7] base to a number sequence expressed in the Galois field GF[3] base generally involves segmenting each element $\{0, 1, 2, \ldots, 6\}$ by their corresponding equivalence class modulo three (3). Since the Galois field GF[3] is a finite field that contains only a finite number of elements $\{0, 1, 2\}$, there is a corresponding equivalence class for the integers zero (0), one (1), and two (2).

The mapping operations of the elements from the Galois field GF[7] to elements in a Galois field GF[3] are listed in the following Table (1),

TABLE 1

| Elements From A Galois Field GF[7]: | Mapping Operations: | Equivalent Elements In A Galois Field GF[3]: |
| --- | --- | --- |
| 0 | 0 modulo 3 | 0 |
| 1 | 1 modulo 3 | 1 |
| 2 | 2 modulo 3 | 2 |
| 3 | 3 modulo 3 | 0 |
| 4 | 4 modulo 3 | 1 |
| 5 | 5 modulo 3 | 2 |
| 6 | 6 modulo 3 | 0 |

As illustrated in Table 1, the mapping operations result in a non-uniform distribution of the elements over the Galois field GF[3]. Specifically, the resulting sequence of the mapping operations is defined as $\{0\ 1\ 2\ 0\ 1\ 2\ 0\}$. There are three elements $\{0, 3, 6\}$ from the Galois field GF[7] in an equivalence class for the integer zero (0). There are two (2) elements $\{1, 4\}$ from the Galois field GF[7] in an equivalence class for the integer one (1). There are two (2) elements $\{2, 5\}$ from the Galois field GF[7] in an equivalence class for the integer two (2). The non-uniformity is apparent since different equivalence classes contain different numbers of elements.

By utilizing a statistical analysis, an attacker of a cryptographic or spread spectrum system implementing the conventional mixed radix conversion algorithm (described above in relation to FIG. 1) can more easily identify an original number sequence from a data stream altered by a resulting number sequence of the mapping operations. For example, if one knows the sizes of the two (2) number bases, then the attacker can use the statistical proportion of elements in the various equivalence classes to identify the original number sequence from the altered data stream. As such, it is desirable to remove statistical artifacts from results derived by a mixed radix conversion algorithm so that identifying an original number sequence from an altered data stream is more difficult.

Accordingly, some embodiments of the present invention provide a method for removing unwanted statistical artifacts in a mixed radix conversion. This method generally includes puncturing a Galois field $GF[2^k]$ pseudo-ring. As used herein, the term "puncturing" means discarding one or more elements in a Galois field $GF[2^k]$ that exceed an integer multiple of a desired characteristic. The "puncturing" is performed to maintain a perfectly uniform distribution over a desired number base. The desired number base includes, but is not limited to, prime number bases that are smaller than the Galois field $GF[2^k]$ base. The Galois field $GF[2^k]$ base is preferably mutually prime with respect to the desired number base. The phrase "mutually prime" as used herein refers to two or more integers having no common divisor except one (1). This method can be used in a variety of communications system applications. For example, such a method can be implemented in a cryptographic system. In such a scenario, the method can be used to increase a security feature of a cryptographic system.

The present invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

Figure 2:
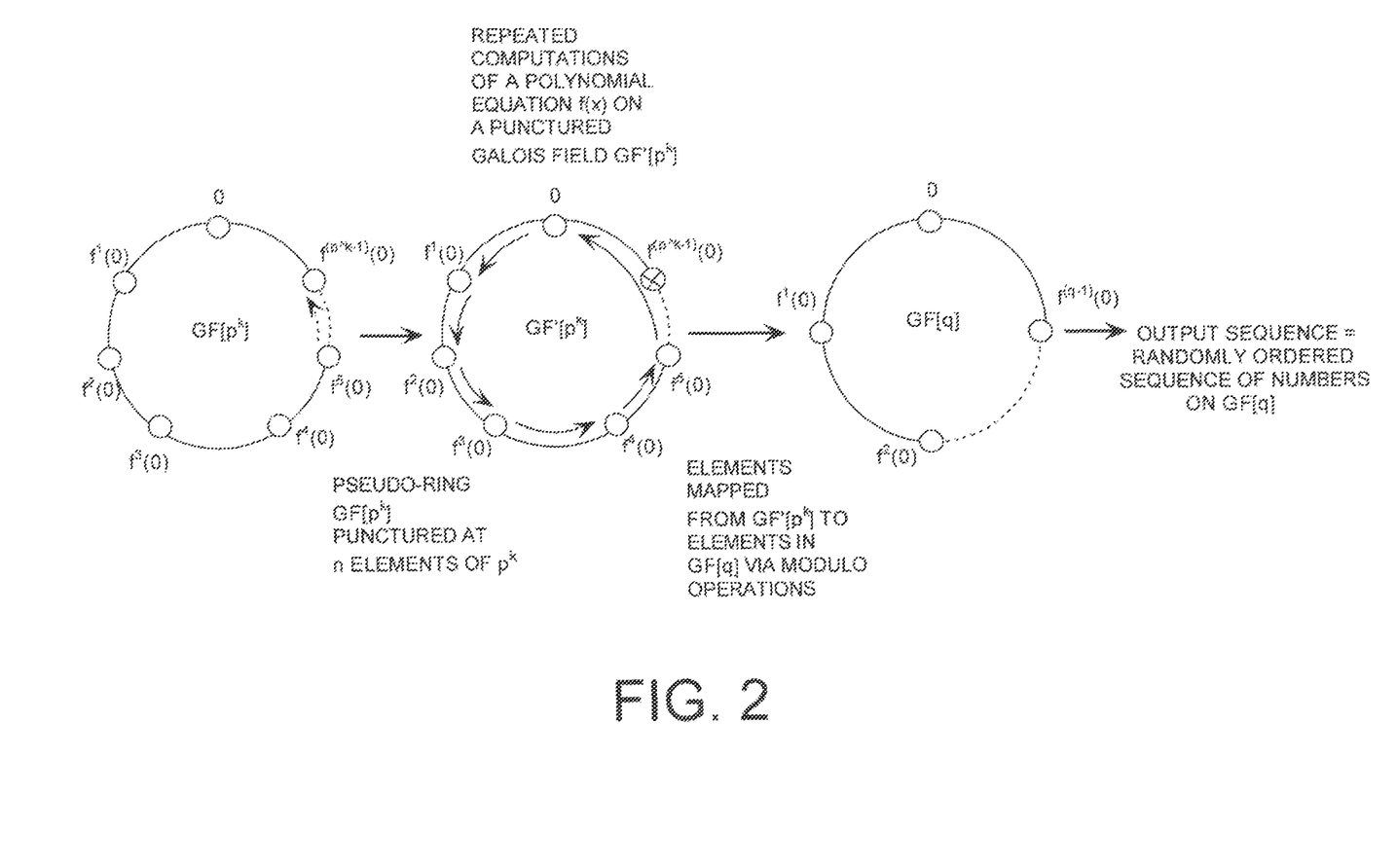
FIG. 2 is a conceptual diagram of a method for removing unwanted statistical artifacts in a mixed radix conversion algorithm that is useful for understanding the invention.

Referring now to FIG. 2, there is provided a conceptual diagram of a method for removing unwanted statistical artifacts in a mixed radix conversion that is useful for understanding the invention. The mixed radix conversion begins with a pseudo-ring defined by a Galois field GF[$p^k$], where $p^k$ is a number defining a finite field size of the Galois field GF[$p^k$]. According to an embodiment of the invention, p is advantageously selected to have a value other than two (2). Still, the invention is not limited in this regard. As should be understood, the Galois field GF[$p^k$] is a field that contains only a finite number of elements $\{0, 1, 2, \ldots, p^k-1\}$. In order to guarantee a mapping having a uniform distribution over a Galois field GF[q], at least one element of the Galois field GF[$p^k$] is discarded. In other words, the Galois field GF[$p^k$] is punctured at one or more elements so as to have a mapping defined by an integer number of complete cycles in a Galois field GF[q] pseudo-ring. The elements discarded need not be contiguous or chosen in any specific order besides their resulting equivalence class in the second Galois field, GF[q]. Moreover, a larger number of elements than the minimum necessary to remove statistical artifacts may be removed in order to more completely mask the attributes of the conversion.

In this regard, it should be appreciated that the number of cycles in the Galois field GF[q] pseudo-ring can be defined by a mathematical Equation (1).

$$NOC=(p^k-n)/q \quad (1)$$

where NOC is the number of cycles in a punctured Galois field GF[$p^k$-n] pseudo-ring. $p^k$-n is a positive integer defining a finite field size of a punctured Galois field GF[$p^k$-n]. q is a positive integer defining a finite field size of a Galois field GF[q].

By substituting the values for $p^k$, n, and q into the mathematical Equation (1), the HOC for the Galois field GF[q] pseudo-ring can be computed. For example, if $p^k$ equals twenty-seven (27), q equals five (5), and the number of punctures n is seven (7), then the NOC for the Galois field GF[5] pseudo-ring equals four (4). In accordance with the embodiment shown in FIG. 2, the Galois field GF[33] (or Galois field GF[27]) could be punctured at elements $\{1, 5, 9, 17, 18, 20, 28\}$. Alternatively, the same Galois field GF[27] ring could be punctured at elements $\{0, 1, 2, 3, 4, 5, 6\}$. Still, the invention is net limited in this regard.

The mixed radix conversion continues with repeated computations of a polynomial equation f(x) modulo $p^k$ on a punctured Galois field GF'[$p^k$], which contains $p^k$-n elements. The results of the computations are numbers expressed in a number base defined by the punctured Galois field GF'[$p^k$] modulo the second number base q. For example, if the punctured Galois field GF'[$p^k$] is selected as a Galois field GF[10] punctured at element nine (9), then the resulting sequence can have a size GF'[10] (or GF[9]). As such, the resulting sequence is defined by the elements $\{0, 1, 2, \ldots, 8\}$. The elements of this resulting sequence are mapped to elements in a Galois field GF[q].

The following Examples are provided in order to further illustrate the present invention. The scope of the present invention, however, is not to be considered limited in any way thereby.

Example 1

Figure 3:
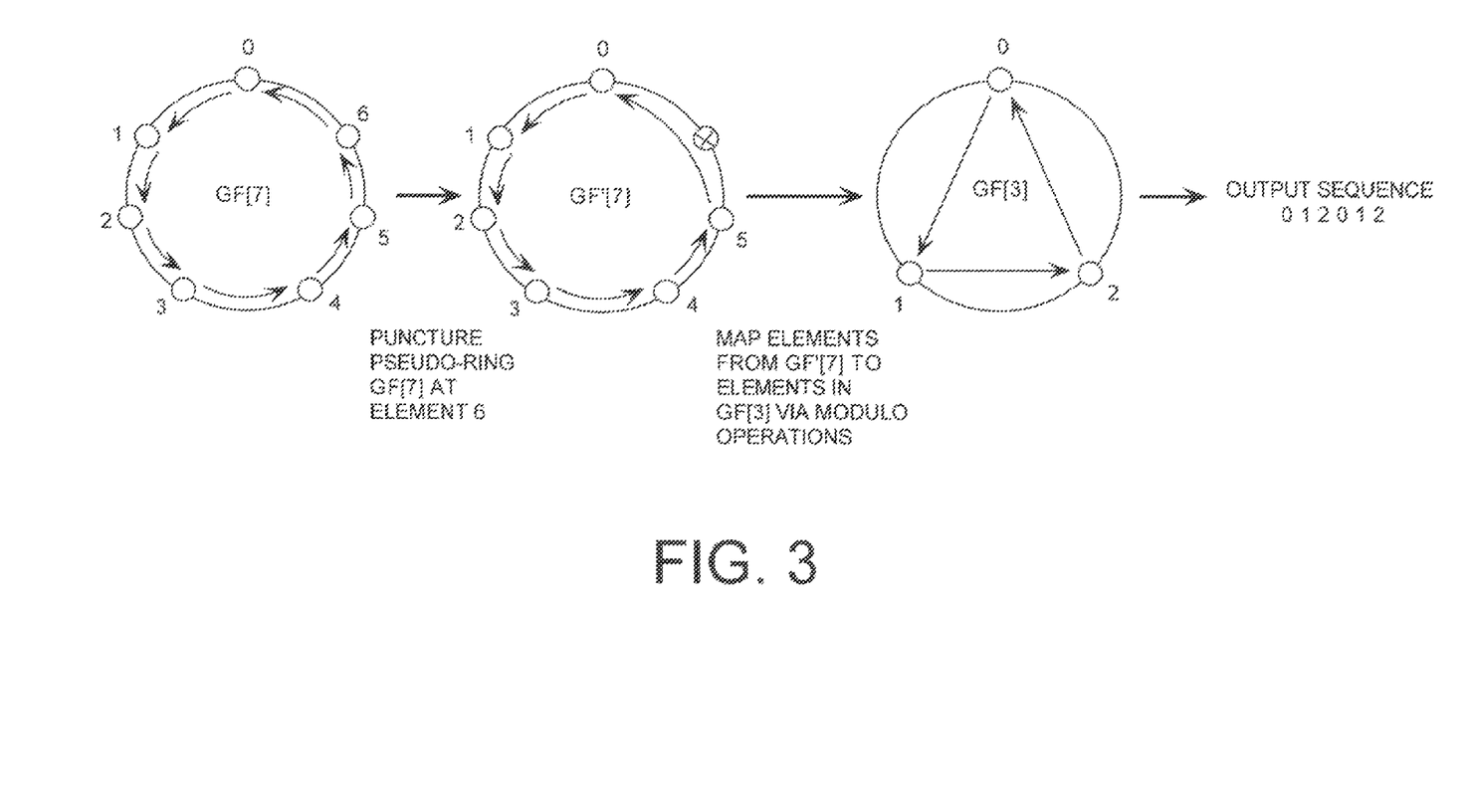
FIG. 3 is a schematic illustration of a mixed radix conversion of elements from a Galois field GF[7] to a Galois field GF[3] that is useful for understanding the invention.

Referring now to FIG. 3, a ring generator is selected to include repeated computations of the trivial polynomial equation f(x)=x on a Galois field GF[7]. The Galois field GF[7] is a field that contains only a finite number of elements $\{0, 1, 2, \ldots, 6\}$. The elements of the Galois field GF[7] are mapped to elements in a Galois field GF[3]. In order to guarantee a uniform distribution over a pseudo-ring defined by the Galois field GF[3], the element of the Galois field GF[7] having a value of six (6) is discarded. In other words, the Galois field GF[7] is punctured at element six (6) so as to have a mapping defined by two (i.e., 6/3=2) complete cycles in the Galois field GF[3]. It should be noted that an equivalent puncturing operation could be obtained by choosing puncture GF[7] at element zero (0) or element three (3) instead of element six (6).

In this regard, it should be appreciated that the number of cycles in the Galois field GF[3] pseudo-ring is defined by the previously discussed mathematical Equation (1), repeated below, $$NOC=(p^k-n)/q$$

where NOC is the number of cycles in the Galois field GF[3] pseudo-ring. Values for the variables are p=7, k=1, n=1, and q=3.

The mappings of the elements in the punctured Galois field GP'[7] to elements in a Galois field GF[3] are listed in the following Table (2).

TABLE 2

| Elements From A Punctured Galois Field GF'[7]: | Mapping Operations: | Elements In A Galois Field GF[3]: |
|---|---|---|
| 0 | 0 modulo 3 | 0 |
| 1 | 1 modulo 3 | 1 |
| 2 | 2 modulo 3 | 2 |
| 3 | 3 modulo 3 | 0 |
| 4 | 4 modulo 3 | 1 |
| 5 | 5 modulo 3 | 2 |

As illustrated in Table 3, the mapping operations result in a uniform distribution of the elements over the Galois field GF[3]. Specifically, the resulting sequence of the mapping operations is defined as $\{0\ 1\ 2\ 0\ 1\ 2\}$. There are two elements $\{0, 3\}$ from the Galois field GF[7] in an equivalence class for the integer zero (0). There are two (2) elements $\{1, 4\}$ from the Galois field GF[7] in an equivalence class for the integer one (1). There are two (2) elements $\{2, 5\}$ from the Galois field GF[7] in an equivalence class for the integer two (2).

Example 2

A ring generator is selected to include repeated computations of a polynomial equation f(x) on a Galois field GF[233]. The Galois field GF[233] is a field that contains only a finite number of elements $\{0, 1, 2, \ldots, 232\}$. The elements of the Galois field GF[233] are mapped to elements in a Galois field GF[5]. In order to guarantee a uniform distribution over a Galois field GF[5], thirteen (13) elements of the Galois field GF[233] are discarded. Chosen arbitrarily, the last thirteen (13) elements are discarded via puncturing. In other words, the Galois field GF[233] pseudo-ring is punctured at element two hundred twenty (220) through element two hundred thirty two (232) so as to have a mapping defined by forty-four (i.e., 220/5=44) complete cycles in a Galois field GF[5] pseudo-ring.

In this regard, it should be appreciated that the number of cycles in the Galois field GF[5] pseudo-ring is defined by a mathematical Equation (2).

$$NOC = p_1/p_2 \qquad (2)$$

where NOC is the number of cycles in the Galois field GF[5] pseudo-ring. $p_1$ is a positive integer number defining a finite field size of a first Galois field GF[233]. $p_2$ is a positive integer number defining a finite field size of a second Galois field GF[5].

By substituting the values for $p^k$, n, and q into the mathematical Equation (1), the NOC for the Galois field GF[5] pseudo-ring can be computed as follows: NOC ($233^1-13$)/5=44. Accordingly, there are forty four (44) complete cycles through the Galois field GF[5] pseudo-ring.

The mappings of the elements of the punctured Galois field GF[233] to elements in a Galois field GF[5] are listed in the following Table (3).

TABLE 3

| Elements From A Punctured Galois Field GF'[233]: | Mapping Operations: | Elements In A Galois Field GF[5]: |
|---|---|---|
| 0 | 0 modulo 5 | 0 |
| 1 | 1 modulo 5 | 1 |
| 2 | 2 modulo 5 | 2 |
| 3 | 3 modulo 5 | 3 |
| 4 | 4 modulo 5 | 4 |
| 5 | 5 modulo 5 | 0 |
| ... | | |
| 215 | 215 modulo 5 | 0 |
| 216 | 216 modulo 5 | 1 |
| 217 | 217 modulo 5 | 2 |
| 218 | 218 modulo 5 | 3 |
| 219 | 219 modulo 5 | 4 |

As illustrated in Table 3, the mapping operations result in a uniform distribution of the elements over the Galois field GF[5]. Specifically, the resulting sequence of the mapping operations is defined as {0 1 2 3 4 ... 0 1 2 3 4}. There are the same number of elements from the Galois field GF[5] in each of the equivalence classes for the integers zero (0), one (1), two (2), three (3), and four (4).

Figure 4:
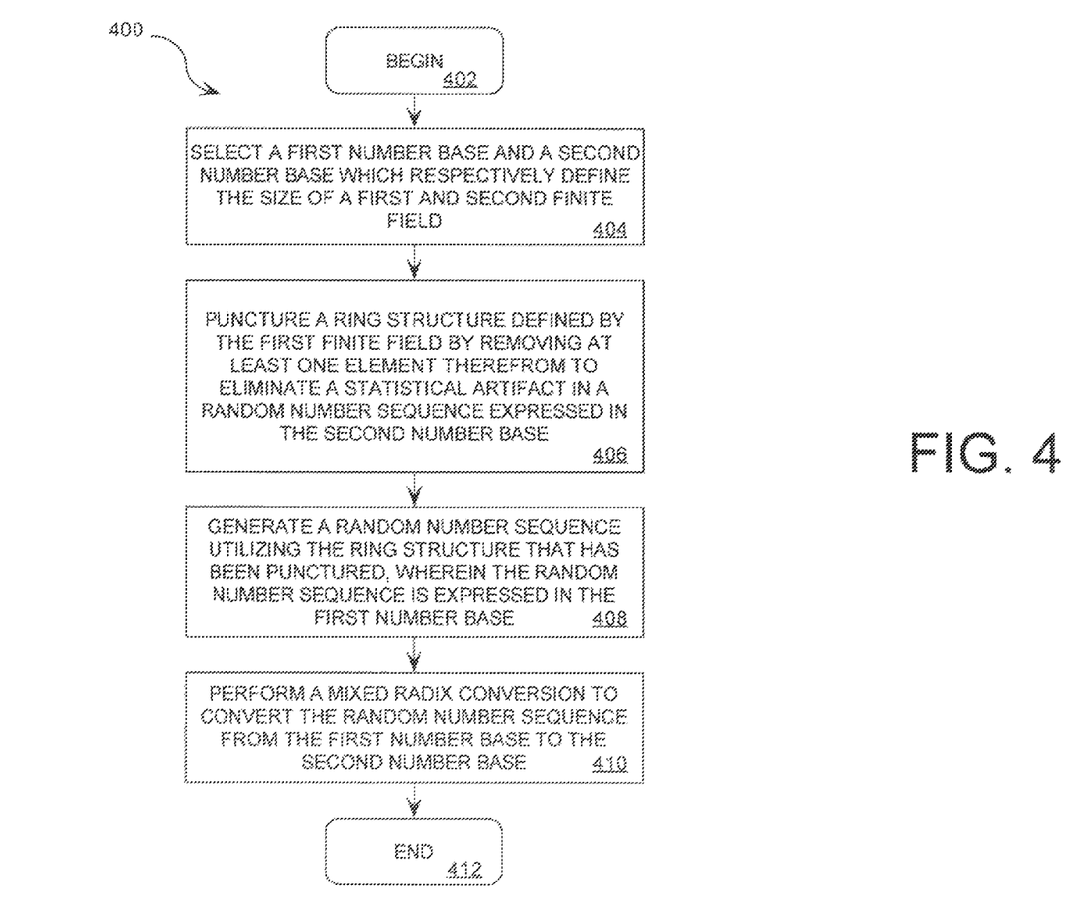
FIG. 4 is a flow diagram of a method for masking a process used in generating a random number sequence that is useful for understanding the invention.

Referring now to FIG. 4, there is provided a flow diagram of a method 400 for masking a process used in generating a random number sequence. As shown in FIG. 4, the method 400 begins with step 402 and continues with step 404. In stop 404, a first number base and second number base are selected. The first number base defines a size of a first finite field. The first finite field can be defined by a first Galois field GF[$p^k$] or a first Galois field GF[M]. The second number base defines a size of a second finite field. The second finite field can be defined by a second Galois field GF[q]. The first Galois field can be selected so that it is mutually prime with respect to the second Galois field. The second Galois field can be selected so that has a finite field size smaller than a finite field size of the first Galois field.

After step 404, the method 400 continues with step 408. In step 406, a ring structure is punctured by removing at least one element therefrom. The ring structure is defined by the first finite field or a first Galois field. This puncturing is performed to eliminate a statistical artifact in a random number sequence expressed in the second number base. The statistical artifact can include a statistical artifact of a mixed radix conversion (described below in relation to step 410). This step can further involve removing n elements from the ring structure. n is determined based on a mathematical relation between a number of elements in the first finite field or Galois field and a number of elements in the second finite field or Galois field. More particularly, n is determined based on a remainder value resulting from a quotient of the number of elements in the first finite field or Galois field GF divided by the number of elements in the second finite field or Galois field.

Subsequently, step 408 is performed where a random number sequence is generated. This step can involve selectively generating the random number sequence utilizing the ring structure which has been punctured. It should be appreciated that the random number sequence generated in this step is expressed in the first number base, in step 410, a mixed radix conversion is performed to convert the random number sequence from the first number base to the second number base, it should be understood that the mixed radix conversion produces a plurality of equivalent classes in the second number base. The n elements which are removed from the ring structure are selected to ensure that each equivalence class has an equal number of elements after performing this step. Thereafter, step 412 is performed where the method 400 ends.

A person skilled in the art will appreciate that method 400 is one method for masking a process used in generating a random number sequence. However, the invention is not limited in this regard and any other method for masking a process used in generating a random number sequence can be used without limitation.

Method for Altering a Data Stream

Figure 5:
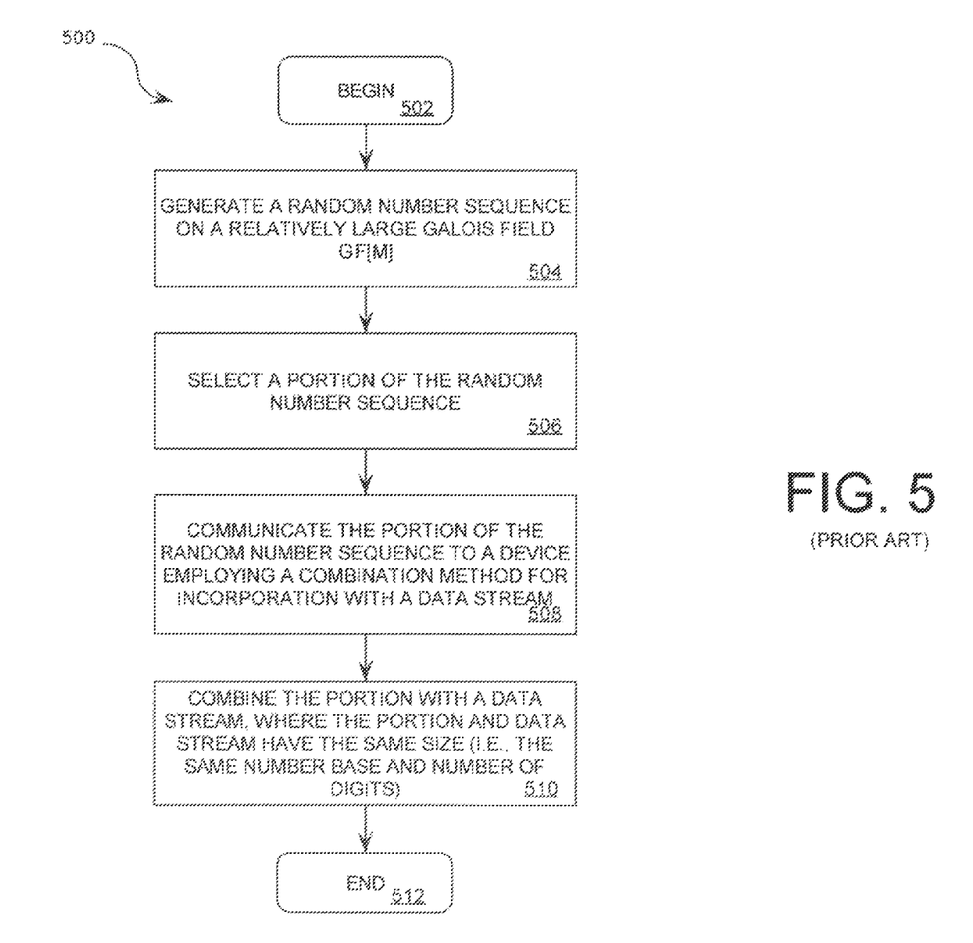
FIG. 5 a flow diagram of a conventional method for altering a data stream that is useful for understanding the invention.

Referring now to FIG. 5, there is provided a flow diagram of a conventional method 500 for altering a data stream that is useful for understanding the invention. As shown in FIG. 5, the method 500 begins with step 502 and continues with step 504, in step 504, a random number sequence is generated. If should be understood that the sequence of random numbers are contained within a relatively large Galois field GF[M]. After generating the random number sequence, step 508 is performed where a portion of the random number sequence is selected.

After step 506, the method 500 continues with step 508. In step 508, the portion of the random number sequence is communicated to a device employing a combination method. Such devices include a multiplier, an adder, a digital logic device, a feedback mechanism, or similar combining function device. Thereafter, the portion of the random number sequence is incorporated or combined with a data stream thereby altering the data stream. In this regard, it should be understood that the portion of the random number sequence and data stream have the same size, i.e., they are expressed in the same number base (or radix) and contain the same number of digits. As such, the method 500 can be modified accordingly. For example, the method 500 can include a conversion step prior to the step 508. The conversion step can involve converting the portion of the random number sequence from a size GF[M] to a size n if the data stream is of a size GF[n] or GF[n/d], where d is an even divisor of n. Subsequently, step 512 is performed where the method 500 ends.

As should be understood, a relatively large Galois field GF[M] provides a certain degree of security to the conventional method 500. In this regard, it should be appreciated that the Galois field GF[M] is a field that contains only a finite number of elements {0, 1, 2, M–1}. As such, an output sequence can repeat every $M^{th}$ element. This repetitive behavior can produce correlations thereby making a decoding of an altered data stream relatively easy when M is small. Consequently, it is desirable to select a relatively large Galois field GF[M].

It should also be appreciated that selecting a truncated portion of the random number sequence also provides a certain degree of security to the conventional method 500. For example, a random number sequence is generated on a Galois field GF[M]. The random number sequence contains five hundred (500) independent p-adic digits. A portion of the random number sequence is selected to include only sixteen (18) of the five hundred (500) digits. By using only sixteen (18) digits of the random number sequence to alter a data stream, it becomes more difficult to determine the deterministic rule employed for generating the random number sequence. Still, it is desirable to further increase the security of the method.

Figure 6:
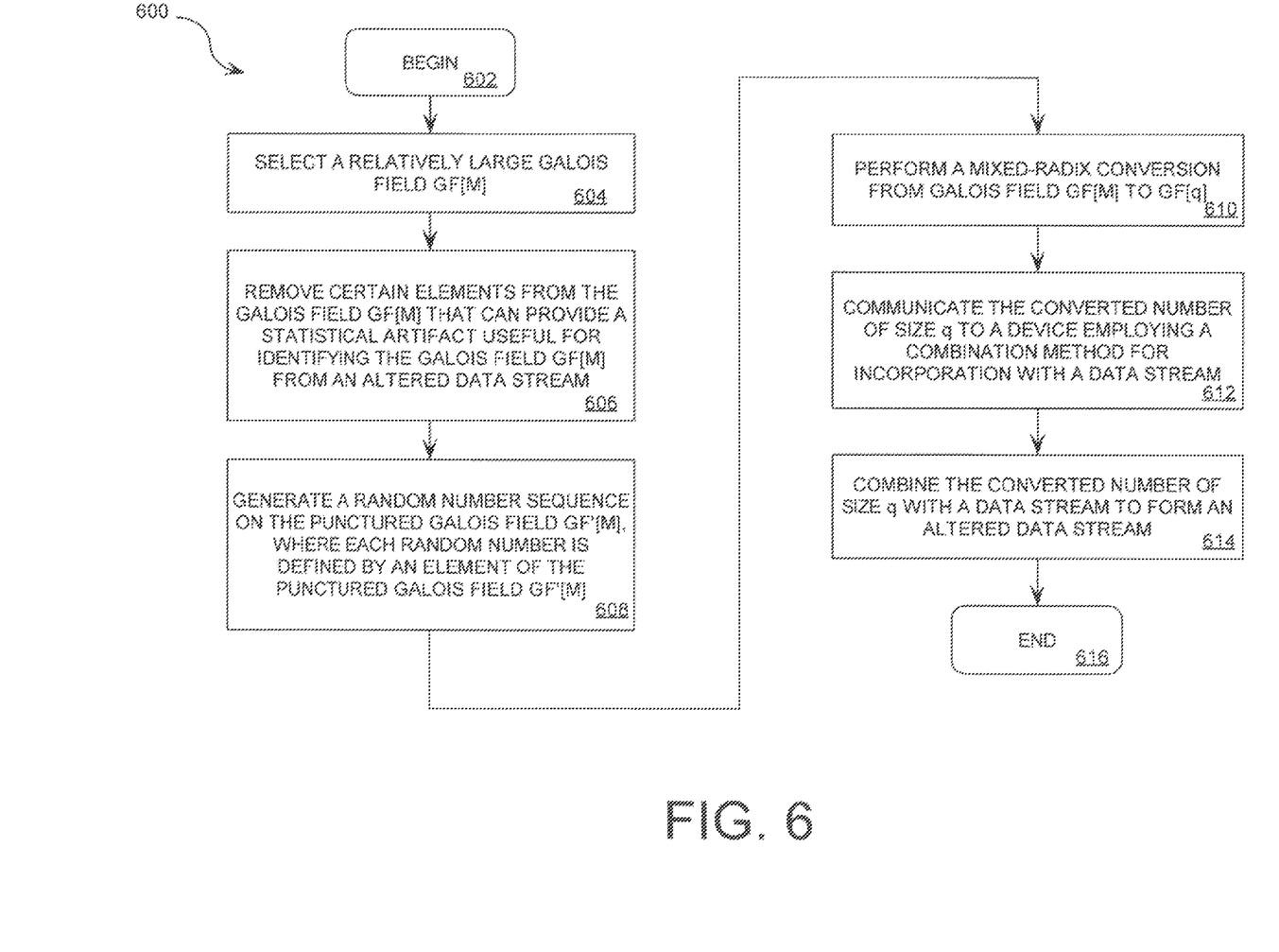

Referring now to FIG. 8, there is provided a method 800 for increasing the security of a communications system that is useful for understanding the invention. As shown in FIG. 6, the method 800 begins with step 602 and continues with step 604. In step 604, a relatively large Galois field GF[M] is selected. As should be understood, a large Galois field can minimize the likelihood that an attacker of a communications system can determine the Galois field GF[M] employed for generating an original random number sequence from an altered data stream. In effect, the large Galois field GF[M] can provide a certain degree of security to a communications system implementing method 600.

Thereafter, step 606 is performed where certain elements are removed from the Galois field GF[M]. The elements are selected as elements that can provide a statistical artifact useful for identifying the Galois field GF[M] from an altered data stream. For example, the elements are selected so that a mixed radix conversion of the same is defined by a set of complete cycles in a Galois field GF[q] pseudo-ring. As a result, this step assures that a subsequent mixed radix conversion will be absent of unwanted statistical artifacts. In effect, this step provides an increased degree of security to a communications system implementing method 600 by making the deterministic rule defining the output sequence dependant on a non-advertised mutually prime number base.

Subsequently, the method 600 continues with step 608. In step 608, a random number sequence is generated on the punctured Galois field GF'[M]. Each random number of the sequence is defined by an element of the punctured Galois field GF'[M].

In step 610, a mixed-radix conversion is performed from a Galois field GF[M] to a Galois field GF[q]. This step involves selecting a portion of the random number sequence. This step also involves converting the selected portion of the random number sequence from a punctured Galois field GF[M] to the resulting output number base represented by the Galois field GF[q]. This step provides an even higher degree of security to a communications system implementing method 600. In this regard, if should be appreciated that it becomes more difficult to determine the Galois field GF[M] and the underlying random number sequence when a mixed-radix conversion is used prior to altering a data stream.

After step 610, step 612 is performed where the resulting value from step 610 mapped on the Galois field GF[q] is communicated to a device employing a combination method for masking a data stream. The combination method may be standard multiplication, multiplication in a Galois extension field, addition modulo q, subtraction modulo q, bitwise logic operations, or any other standard combination method. In this regard, it should be understood that the Galois field GF[q] output and input data stream need not have the same size if proper combination techniques are used. In step 614, the resulting value from step 610 is combined with a data stream to form an altered data stream. Thereafter, step 618 is performed where the method 600 ends.

A person skilled in the art will appreciate that method 600 is one method for increasing a security of a communications system. However, the invention is not limited in this regard and any other method implementing the present invention can be used without limitation.

Hardware Implementation

Figure 7:
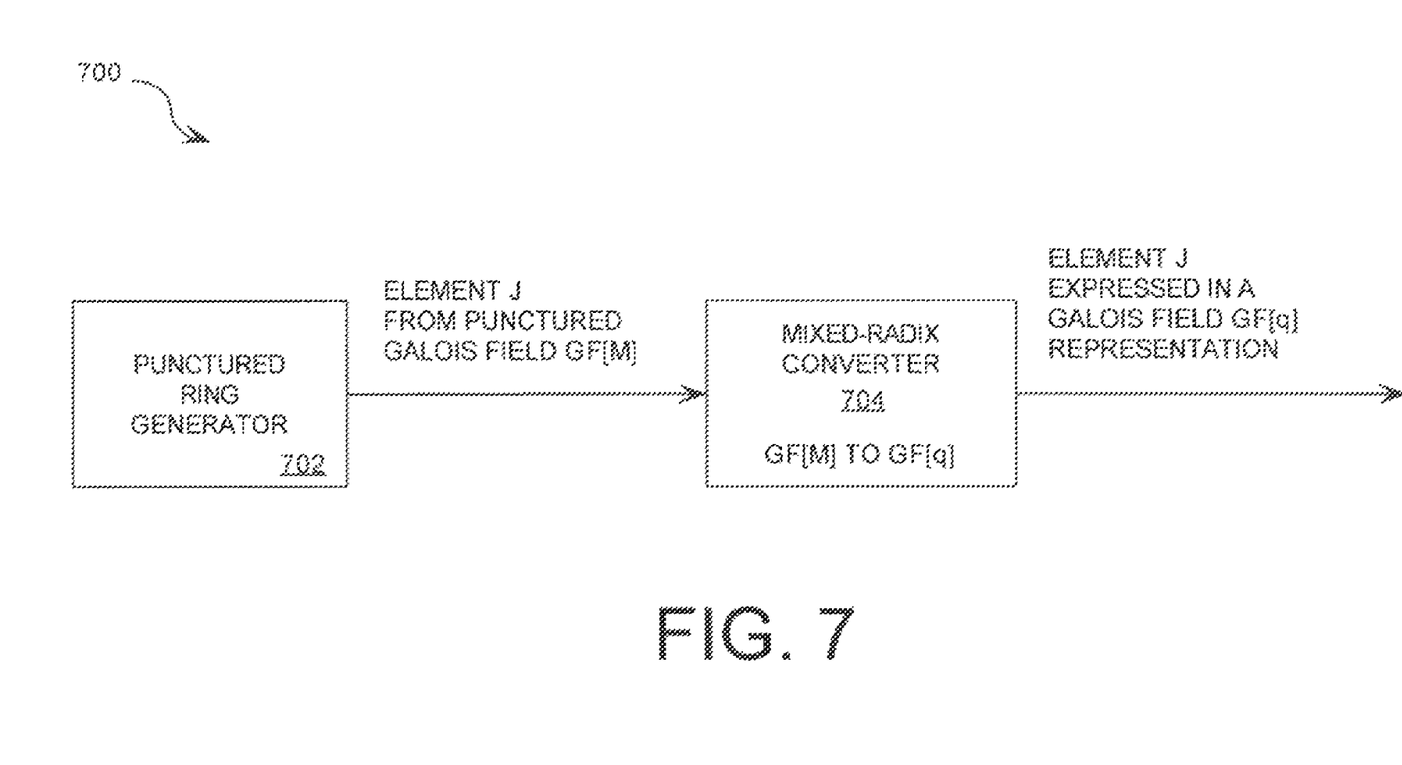
FIG. 7 is a block diagram of a system having a punctured ring generator that is useful for understanding the invention.

Referring now to FIG. 7, there is provided a system 700 that is useful for understanding the invention. As shown in FIG. 7, the system 700 is comprised of a punctured ring generator 702 and a mixed radix converter 704. It should be understood that the punctured ring generator 702 and the mixed radix converter 704 are configured in combination to produce a random number sequence in a second number base which is exclusive of any statistical artifacts associated with a mixed radix conversion.

As shown in FIG. 7, the punctured ring generator 702 is comprised of hardware and software configured to generate a random number sequence expressed in a first number base. The punctured ring generator 702 is also comprised of hardware and software configured to selectively generate the random number sequence utilizing a ring structure which has been punctured. The ring structure can be a punctured Galois field GF'[M] pseudo-ring. Each of the random numbers can each be defined by or as an element from the punctured Galois field GF'[M]. The ring structure has at least one element removed therefrom to eliminate a statistical artifact in a random number expressed in a second number base. The punctured ring generator 702 is further comprised of hardware and software configured to communicate random numbers to the mixed radix converter 704.

The mixed radix converter 704 is comprised of hardware and software configured to perform mixed radix conversion. The mixed radix conversion involves performing arithmetic operations to convert a random number J from a first number base to a second number base. According to an aspect of the invention, the first number base is defined by a first Galois field GF[M]. Similarly, the second number base is defined by a second Galois field GF[q]. The first Galois field GF[M] can be mutually prime with respect to the second Galois field GF[q]. The second Galois field GF[q] has a finite field size smaller than the finite field size of the first Galois field GF[M].

The arithmetic operations can involve performing modulo operations. Modulo operations are well known to those skilled in the art, and therefore will not be described in great detail herein. However, it should be appreciated that modulo operations can generally be defined by a mathematical Equation (2), $$R = J\,\mathrm{modulo}(q) \qquad (2)$$

where R is a remainder derived from a modulo operation. J is a random number input to the mixed radix converter 704. q is a modulus having a value selected to be a positive integer defining a finite field size of a Galois field GF[q]. It should be noted that the range of values for J are $\{0, 1, 2, \ldots, M\}$ and the range of values for R are $\{0, 1, 2, \ldots, q-1\}$.

The mapping operations can also involve lookup table operations. In such a scenario, the mixed radix converter 704 can query a data store (not shown) for information necessary to map a random number J modulo q. The mixed radix converter 704 is also comprised of hardware and software configured to communicate a random number J expressed in a Galois field GF[q] base to an external device (not shown).

According to an aspect of the invention, the ring structure has n elements removed therefrom. By removing the n elements from the ring structure, at least one statistical artifact is eliminated in the random number sequence expressed in the second number base, it should be understood that n is determined based on a mathematical relation between a number of elements in the first Galois field and a number of elements in a second Galois field. More particularly, n is determined based on a remainder value from a quotient of the number of elements in the first Galois field divided by the number of elements in the second Galois field.

According to another aspect of the invention, the mixed radix conversion produces a plurality of equivalence classes in the second number base. The n elements which are removed from the ring structure are selected to ensure that each equivalence class has an equal number of elements after the mixed radix conversion.

A person skilled in the art will appreciate that the system 700 is one architecture of a system implementing the present invention. However, the invention is not limited in this regard and any other system architecture implementing the present invention can be used without limitation. For example, the system can further be comprised of a means for modifying a digital data stream utilizing the random number sequence.

In light of the foregoing description of the invention, it should be recognized that the present invention can be realized in hardware, software, or a combination of hardware and software. A method of generating an arbitrary permutation ordering of bits according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or an FPGA could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; h) reproduction in a different material form. Additionally, the description above is intended by way of example only and is not intended to limit the present invention in any way, except as set forth in the following claims.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

We claim:

1. A method for masking a process used in generating a random number sequence, comprising:
    generating, by at least one electronic circuit, a random number sequence;
    performing, by said electronic circuit, a mixed radix conversion to convert said random number sequence from a first number base to a second number base; and
    combining, by said electronic circuit, said random number sequence expressed in said second number base with a sequence of symbols defining information to be stored in a storage device or transmitted over a communications link;
    wherein said generating step further comprises selectively generating said random number sequence utilizing a ring structure that has been punctured.

2. The method according to claim 1, wherein said ring structure is punctured by removing at least one element therefrom to eliminate a statistical artifact in said random number sequence expressed in said second number base.

3. The method according to claim 2, wherein said at least one element is selected to induce a chosen statistical artifact in said mixed radix conversion step.

4. The method according to claim 2, wherein said first number base and said second number base are selected so that they are respectively defined by a first Galois field characteristic and a second Galois field characteristic.

5. The method according to claim 4, wherein said first Galois field characteristic is selected so that it is mutually prime with respect to said second Galois field characteristic.

6. The method according to claim 4, wherein said second Galois field characteristic is selected to be a finite field size which is smaller as compared to a finite field size of a first Galois field.

7. The method according to claim 6, wherein said puncturing step further comprises eliminating n element(s) from said ring structure to remove at least one statistical artifact in said random number sequence expressed in said second number base, wherein n is determined based on a mathematical relation between a number of elements in said first Galois field and a number of elements in a second Galois field.

8. The method according to claim 7, wherein n is determined based on a remainder value resulting from a quotient of said number of elements in said first Galois field divided by said number of elements in said second Galois field.

9. The method according to claim 7, wherein said mixed radix conversion produces a plurality of equivalence classes in said second number base, and said n elements which are eliminated from said ring structure are selected to ensure that each equivalence class has an equal number of elements after said performing a mixed radix conversion step.

10. A system, comprising:
    a generator configured for selectively generating a random number sequence utilizing a ring structure which has been punctured;
    a mixed radix converter configured for performing a mixed radix conversion to convert said random number sequence from a first number base to a second number base; and
    wherein said ring structure which has been punctured and said mixed radix converter are configured in combination to produce a random number sequence in said second number base which is exclusive of any statistical artifacts associated with said mixed radix conversion.

11. The system according to claim 10, further comprising a means for modifying a data stream utilizing said random number sequence expressed in said second number base.

12. The system according to claim 10, wherein said first number base and said second number base are respectively defined by a first Galois field characteristic and a second Galois field characteristic.

13. The system according to claim 12, wherein said first Galois field characteristic is mutually prime with respect to said second Galois field characteristic.

14. The system according to claim 12, wherein said second Galois field characteristic is selected as a finite field size which is smaller as compared to a finite field size of a first Galois field.

15. The system according to claim 14, wherein said ring structure has n element(s) removed therefrom to eliminate at least one statistical artifact in said random number sequence expressed in said second number base, wherein n is determined based on a mathematical relation between a number of elements in said first Galois field and a number of elements in a second Galois field.

16. The system according to claim 15, wherein n is determined based on a remainder value resulting from a quotient of said number of elements in said first Galois field divided by said number of elements in said second Galois field.

17. The system according to claim 16, wherein said mixed radix conversion produces a plurality of equivalence classes in said second number base, and said n elements which are removed from said ring structure are selected to ensure that each equivalence class has an equal number of elements after said mixed radix conversion.

\* \* \* \* \*